United States Patent [19]

Butler et al.

[11] 4,275,889
[45] Jun. 30, 1981

[54] SEAL CONSTRUCTION

[75] Inventors: Gordon K. Butler, Columbus; Robert T. Jefferson, Crothersvill, both of Ind.

[73] Assignee: Cummins Engine Company, Inc., Columbus, Ind.

[21] Appl. No.: 83,684

[22] Filed: Oct. 11, 1979

Related U.S. Application Data

[63] Continuation of Ser. No. 894,121, Apr. 6, 1978, abandoned.

[51] Int. Cl.$^3$ .................................................. F16J 15/36
[52] U.S. Cl. .......................................... 277/42; 277/88; 277/92; 277/96.2; 277/DIG. 6
[58] Field of Search ..................................... 277/38–43, 277/81 R, 88–90, 92, 96 R, 96.2, DIG. 6

[56] References Cited

U.S. PATENT DOCUMENTS

| 2,881,015 | 4/1959 | Wahl ............................ 277/96 R X |
| 2,884,268 | 4/1959 | Amirault et al. ................. 277/92 X |
| 2,916,313 | 12/1959 | Ziller et al. .................... 277/96.2 X |
| 2,994,547 | 8/1961 | Dolhun et al. ..................... 277/89 |
| 3,074,728 | 1/1963 | Freed ............................ 277/90 X |
| 3,117,793 | 1/1964 | Houser et al. ................... 277/42 X |
| 3,782,735 | 1/1974 | Novosad ......................... 277/92 X |
| 3,785,856 | 1/1974 | Gotoh ...................... 277/DIG. 6 X |
| 3,977,465 | 8/1976 | Tank ........................... 277/92 X |
| 4,066,269 | 1/1978 | Linne ...................... 277/DIG. 6 X |
| 4,095,807 | 6/1978 | Jandt et al. ...................... 277/40 |

FOREIGN PATENT DOCUMENTS

| 602681 | 8/1960 | Canada ........................... 277/40 |
| 1473051 | 5/1977 | United Kingdom . |

*Primary Examiner*—Robert S. Ward, Jr.
*Attorney, Agent, or Firm*—Merriam, Marshall & Bicknell

[57] ABSTRACT

This disclosure relates to a seal which is particularly suited for use in a coolant pump of an internal combustion engine. The seal parts are subjected to high rotational torques during operation of the pump, and the seal parts are constructed and assembled in such a manner as to accommodate the rotational torques. The seal includes a flexible bellows having a composition which withstands the engine coolant on one side and oxidation on the other side, and has ribs which strengthen it. The seal faces are constructed of a material and have dimensions to reduce the magnitude of the rotational torques. The seal parts are secured together so as to prevent them from being pulled apart by the rotational torques, adhesives being used for this purpose which withstand the engine coolant.

29 Claims, 7 Drawing Figures

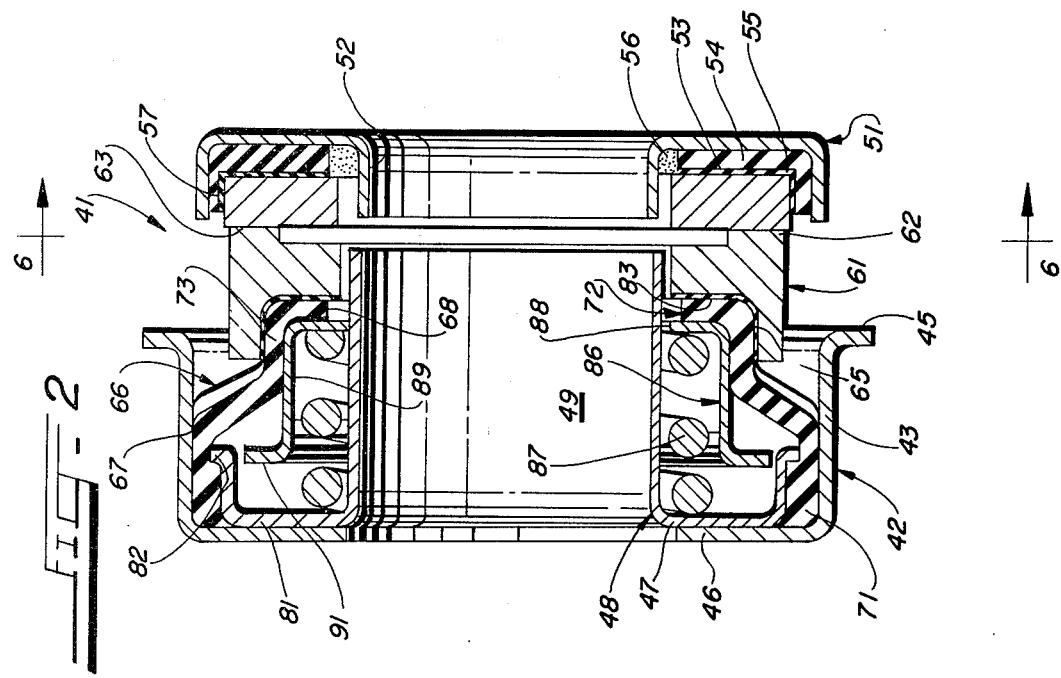
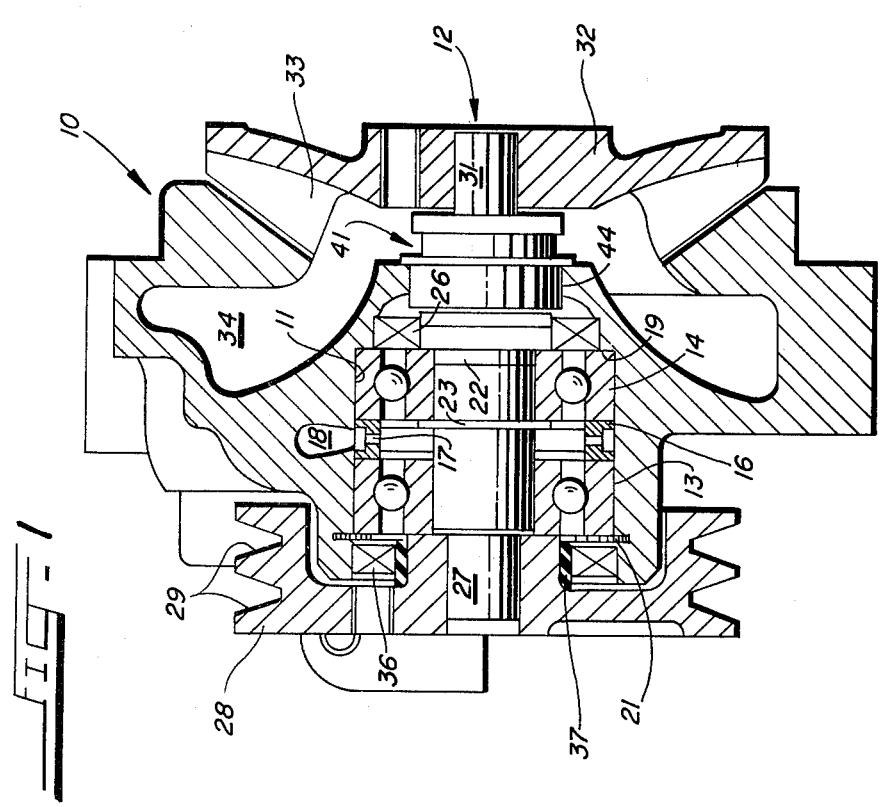

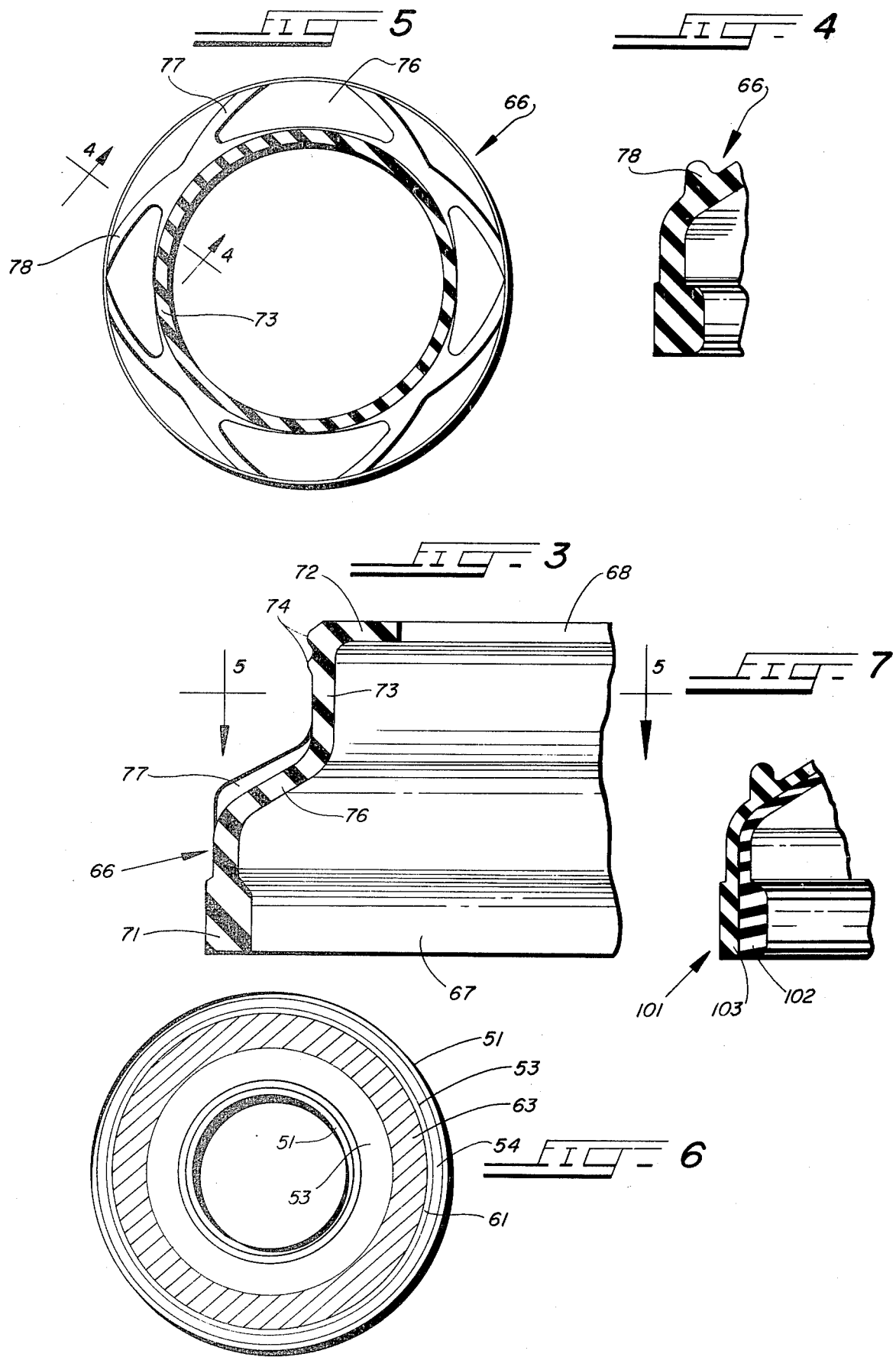

SEAL CONSTRUCTION

This is a continuation of application Ser. No. 894,121, filed Apr. 6, 1978, now abondoned.

A conventional liquid cooled internal combustion engine has a coolant system including a pump which circulates the coolant through the engine. A common type of coolant pump has an impeller located in the coolant and a belt drive which is external of the coolant. The pump further has a face seal which prevents the coolant from leaking out of the coolant system between the stationary housing and the rotating pump shaft.

A requirement of such pumps installed in large truck engines is that they should operate for at least 300,000 miles without failure. The conventional face seal of such a pump has been subject to failure, however, mainly due to the rotational torques encountered during operation of the pump and to weakening of seal components by the chemicals contained in the coolant. The rotational torques arise from the stick-slip operation of the seal faces and have been high enough to pull the seal components apart. The seal includes a flexible bellows, and the rotational torques have also torn the bellows. The seal bellows has also been subjected to the high coolant temperatures and to the coolant chemicals on one side and oxidation on the other side, these factors producing premature aging of conventional seal bellows and making them more subject to failure by the rotational torques.

It is a general object of the present invention to provide an improved seal which substantially overcomes the foregoing disadvantages. The seal components are secured together to prevent their separation due to rotational torques, the materials of the components have a relatively long life in the face seal environment, the bellows is shaped to strengthen it against the torques, and the seal faces are dimensioned and made of a material to reduce the magnitude of the torques.

Other objects and advantages of the present invention will become apparent from the following detailed description taken in conjunction with the accompanying figures of the drawings, wherein:

FIG. 1 is a sectional view of a coolant pump including a face seal incorporating the present invention;

FIG. 2 is an enlarged sectional view of the seal;

FIG. 3 is an enlarged sectional view of a bellows of the seal;

FIG. 4 is a further enlarged fragmentary sectional view taken on the line 4—4 of FIG. 5;

FIG. 5 is a sectional view taken on the line 5—5 of FIG. 3;

FIG. 6 is a sectional view taken on the line 6—6 of FIG. 2; and

FIG. 7 is a view similar to FIG. 4 but showing an alternative form of the invention.

The water pump illustrated in FIG. 1 includes a body 10 which may be formed by casting, and has a plurality of holes (not shown) formed therethrough which may be employed in securing the body 10 to the block of an internal combustion engine. The body 10 further has a relatively large axially extending opening 11 formed therethrough which receives a water pump shaft 12. The shaft 12 is rotatably mounted in the opening 11 by two axially spaced ball bearings 13 and 14, a spacer 16 being provided between the outer races of the two bearings 13 and 14. A passage 17 is formed through the spacer 16 and a lubrication receiving passage 18 is formed in the body 10, whereby the bearings 13 and 14 may receive lubrication through the passages 17 and 18. The right hand side of the bearing 14 abuts a shoulder 19 formed on the body 10 and a bearing retaining ring 21 is fastened in a groove formed in the inner periphery of the opening 11 and abuts the left hand end of the bearing 13. Thus, the two bearings 13 and 14 are secured in place in the opening 11 of the body 10. The shaft 12 is attached to the inner race of the bearing 14 by a shoulder 22 formed on the shaft 12 and by a snap ring 23 which is fastened in a groove formed on the shaft 12. The shoulder 22 abuts the right hand side of the inner race of the bearing 14 and the snap ring 23 abuts the left hand side of this inner race, thereby preventing the shaft 12 from moving axially relative to the bearing 14. Toward the right of the shoulder 22 of the shaft 12 is a lip oil seal 26 received in an annular recess 15 extending from shoulder 19 and prevents the lubricant from leaking out of the bearing area toward the right.

The left hand end of the shaft 12 has a reduced diameter section 27, and a water pump pulley 28 is secured to the section 27 as by a press fit. The outer periphery of the pulley 28 has two annular grooves 29 formed therein which receive V-belts (not shown) that drive the pulley 28 and the shaft 12 when the engine is running. Alternatively shaft 12 may be gear driven for certain engine applications.

The right hand end of the shaft 12 has a reduced diameter section 31 which has a pump impeller 32 secured thereto as by a press fit. The impeller 32 includes a plurality of angularly spaced, radially extending vanes 33 which, when the shaft 12 and the impeller 32 are rotated, pumps the coolant through the coolant system of the engine. The body 10 of the pump has a coolant inlet passage 34 formed therein which is connected to receive the coolant entering the pump. The coolant flows from the passage 34 and is pumped, by rotation of the impeller 32, radially outwardly through the passages between the vanes 33.

At the left hand end of the opening 11 is another lip seal 36 which extends between the inner periphery of the opening 11 and a wear sleeve 37 that is fastened to the outer periphery of the pulley hub adjacent the lip seal 36.

To prevent the coolant that flows through the passage 34 and between the vanes 33 from entering the area of the bearings 13 and 14, a face seal 41 (FIGS. 1 and 2) is provided between the pump body 10 and the shaft 12. The face seal 41 includes a generally tubular cartridge 42 including an axially extending outer portion 43 which is secured as by a press fit to the pump body 10 in an opening 44. A sealant is also preferably provided in the opening 44 to seal this connection. A radially outwardly extending flange 45 formed on the right hand end of the outer portion 43 serves as a stop as the face seal catridge 42 is pressed into a sealed fit with the body 10. At its left hand side, the cartridge 42 includes a radially extending portion 46 which is engaged by a radial portion 47 of an inner ferrule 48. The ferrule 48 includes an axially extending tubular central portion 49 which is sized to extend around the shaft 12 without engaging the shaft.

The face seal 41 further includes an annular cup 51 which is U-shaped in cross section. One arm of the U forms a tubular portion 52 that is sized to be secured to the shaft 12 as by a press fit. As shown in FIG. 2, an annular seat washer 53 is positioned between the arms of the U, the washer 53 being rectangular in cross section. An annular rubber boot 54 is mounted between the seat washer 53 and the seat cup 51, the boot 54 being secured to the seat cup 51 by a suitable process such as a nitrile phenolic adhesive 56. The seat washer 53 is secured to the boot 54 by epoxy adhesive 55. Alternately the boot 54 is replaced by a coating of rubber vulcanized to the inner surfaces of the seat cup 51, in that instance the washer 53 is secured to the vulcanized rubber by adhesive 55. An example of a suitable adhesive 56 is product No. 2126 or product No. 826 sold by 3M Company. Lip 57 of the boot 54 is held under compression between the outer periphery of the washer 53 and the outermost arm of the cup 51. An example of an epoxy adhesive which forms both an adhesive and a sealer is product 217 sold by Hughson Chemical Company. A liquid tight seal is formed between the washer 53 and the cup 51 and the parts are firmly secured together. Since the cup 51 is secured to the shaft 12, the seat washer 53 of course rotates with the shaft 12 during operation of the engine and the pump.

The face seal 41 further includes an annular seal ring 61 which includes a nose 62 that engages the seat washer 53. The seat washer 53 rotates with the shaft 12 while the seal ring 61 does not rotate, and a hydrodynamic film is formed between the adjoining surfaces 63 of the seal ring 61 and the washer 53. The composition and the dimensions of the seal ring and the washer 53 will be discussed in more detail hereinafter.

The seal ring 61 is supported on the cartridge 42 by a bellows 66 (FIGS. 2 to 5) which both acts as a support for the seal ring 61 and forms a seal between the seal ring 61 and the cartridge 42. The seat cup 51, the seat washer 53, the outer periphery of the seal ring 61 and the outer surface of a portion of the bellows 66 are exposed to the coolant in the coolant system, and the cartridge 42 is sealingly connected to the pump body 10. The bellows 66 is made of a flexible material and has a fixed end 67 which is secured to the stationary cartridge 42 and a movable end 68 which is secured to the seal ring 61, these connections being secure enough to accommodate high rotative torques. The ring 61 is secured to the bellows by a press fit and by a nitrile-phenolic based adhesive 15 of the character described above. In the present example, the fixed end 67 has a larger diameter than the movable end 68 and the bellows 66 is generally tubular as shown in FIGS. 2 and 5, but it should be understood that the parts could be sized to result in the fixed end having a smaller diameter than the movable end. The fixed end 67 further has an enlarged portion or bulb 71, the bulb 71 having a greater radial thickness than the central section 76 of the bellows. The movable end 68 includes a radially inwardly extending flange portion 72 and a cylindrical portion 73. At the juncture of the two portions of 72 and 73 are formed a pair of annular, radially outwardly extending ribs 74.

The central section 76 of the bellows 66 connects the fixed and movable ends 67 and 68, the central section 76 being slanted as best shown in FIGS. 2 and 3. With specific reference to FIG. 5, the central section 76 has a plurality of tangentially extending ribs 77 and 78 formed thereon. The ribs 77 slant in the clockwise direction from the smaller diameter movable end 68 to the larger diameter fixed end 67, while the other ribs 78 slant in the counterclockwise direction. A plurality of such ribs are preferably provided in pairs at regularly spaced angular intervals around the circumference of the central section 76, and in the present illustration four ribs 77 and four ribs 78 are provided. As is shown in FIG. 5, the ribs 77 and 78 of each pair merge or join at their radially inner ends which are adjacent the portion 73 of the movable end 68. Further, the ribs extend generally tangentially outwardly from the surface of the portion 73. While the ribs 77 and 78 are preferably provided on the outer surface of the bellows 66 as shown, they could instead be provided on the inner surface of the bellows.

With reference again to FIG. 2, the enlarged bulb 71 at the fixed end 67 of the bellows 66 is sealingly secured between the inner surface of the cartridge 42 and the outer surface of an axial portion 81 of the ferrule 48. The bulb 71 fits into the corner formed between the portions 43 and 46 of the cartridge 42, and a radial flange 82 of the ferrule 48 clamps the bulb 71 in the corner and prevents the bellows 66 from moving toward the right relative to the cartridge 42. The seal ring 61 is recessed at its inner periphery in the area indicated by the reference numeral 83, and the flange 68 of the bellows 66 is sized to fit into the recess 83. The ribs 77 and 78 of the bellows 66 (FIG. 5) angle outwardly from the seal ring 61 to the cartridge 42. A spring retainer 86 fits against the inner surface of the flange 72 and the axial portion 73 of the movable end 68 and tightly clamps the movable end 68 to the seal ring 61. The annular ribs 74 (FIG. 3) are provided to ensure a sealed connection between the bellows 66 and the seal ring 61. A cylindrical compression spring 87 is positioned between a radially inwardly extending flange 88 of the spring retainer 86 and the radial portion 47 of the ferrule 48, the compression spring urging the spring retainer 86, the movable end 68 of the bellows, and the seal ring 61 toward the right relative to the other parts of the face seal. In addition to the radial flange 88, the spring retainer 86 includes an axially extending cylindrical portion 89 and a radially outwardly extending flange 91 at its left hand end. The axial portion 73 of the bellows against the outer surface of the cylindrical portion 89 of the spring retainer 86, and the outer edge of the flange 91 is spaced slightly from the inner surface of the cylindrical portion 81 of the ferrule 48.

The face seal is preferably constructed and assembled as follows: The seat cup 51 is assembled with the seat washer 53 and with the boot 54 in the manner previously described. The movable end 68 of the bellows is pressed into the recess 83 of the seal ring 61 and the spring retainer 86 is pressed against the inner surface of the movable end, the parts being dimensioned to produce a tight fit between these parts. In addition, the adhesive 65 is provided between the flange 72 of the bellows and the seal ring 61 in order to sealingly secure these two parts together, and to prevent the ring 61 from separating from the bellows 66 due to high rotational torques. The compression spring 87 is then positioned within the spring retainer 86 and the ferrule 48 is positioned coaxially within the spring 87 and the bellows 66. The enlarged bulb 71 of the bellows is positioned over the outer surface of the axial portion 81 of the ferrule 48 and then the cartridge 42 is pressed over the outer surface of the bulb 71. A lubricant is preferably applied to the outer surface of the bulb 71 to facilitate sliding the bulb 71 into the cartridge 42. The cup 51 is secured to the water pump shaft 12 and the cartridge 42 is secured in the opening of the pump body 10 as shown in FIG. 1. A sealant is preferably applied between the cartridge 42 and the opening 44 in order to seal this connection.

It will be apparent from the foregoing that the outer surface of the bellows 66 is exposed to the coolant of the engine whereas the inner surface of the bellows is exposed to air within the opening 11. The lip seal 26 prevents the lubricant from reaching the inner surface of the bellows.

As previously mentioned, prior art seals of this general character were subject to failure and could not be relied upon to remain in service for 300,000 miles. Failures arose primarily from the rotational torques to which the seal is subjected during operation, and to the chemicals in the coolants.

The rotational torques arise from the "stick-slip" characteristics of operation of such a seal. The faces 63 of the seat washer 53 and the seal ring 61 normally are separated by a hydraulic film which acts between the mating faces. When the film is present, there is a low coefficient of friction between the faces 63, but the coefficient increases if the film partially or entirely disappears for an instant. It is typical of the operation of such a seal that the film varies during operation and that the faces 63 will frequently momentarily stick together and then slip as the seat washer 53 rotates relative to the seal ring. Of course, the rotational torque on the seal parts is increased tremendously during a stick period, and the seal ring 61 tends to turn with the washer 53 during such a period. Due to such stick-slip operation, the ring 61 and the movable end of the bellows 66 angularly shift back and forth during operation.

The described rotational torques and angular shifting causes failures of prior art seals in a number of different ways. First of all, the seat washer is pulled loose from the seat cup. This type of failure is prevented in the present construction by the adhesive 55 and by securing the boot 54 to the cup 51 through an adhesive 56 or alternately by adhesive bonding the washer 53 to a layer of rubber vulcanized to the cup 51. Second, the seal ring was pulled loose from the bellows. This is prevented in the present construction by the adhesive 83 and by the tight fit between the ring 61 and the bellows 66. Third, the bellows was torn. This type of failure is prevented by the ribs 77 and 78 which stiffen and strengthen the bellows. The set of ribs 77 or 78 which are placed in tension by the rotational torques are the ribs which provide these advantages, but ribs are preferably provided in both directions as shown so that the bellows may be used with pumps designed for either direction of rotation.

The angular shifting of the seal ring and the movable part of the bellows also tended to produce failures. The angular shifting causes the bellows to flex and causes heat generation in the bellows which, when added to the heat of the coolant, tended to reduce the life of the bellows. The heat ages the bellows material and makes it more susceptible to tearing. This tendency to fail due to the flexing is reduced by the ribs 77 and 78 which stiffen the bellows and thus reduce the amount of flexing. In addition, the central section of the prior art bellows extend generally radially. The pressure of the coolant is in the neighborhood of positive 14 psi in a pressurized system, and this pressure is sufficient to balloon the central section inwardly and to press it against the internal seal parts. The flexing of the bellows then tended to rub and wear a hole in the bellows. Further, the central section of the prior art bellows would form a fold due to the ballooning, and dirt particles collected in the pocket of the fold. The flexing of the bellows resulted in the particles wearing a hole in the bellows.

Failures due to flexing as described are avoided by the ribs 77 and 78 and by slanted design of the central section of the bellows. The ribs 77 and 78 stiffen the central section and reduce flexing, and the ribs and the slanted design reduce inward ballooning. The stiffening of the central section by the ribs reduces oscillations or flexing, and thereby reduced the amount of heat generated and the rubbing.

Failures due to the rotational torques are also reduced by the design of the seat washer 53 and the seal ring 61. Both of these parts are made of silicon carbide which is a very hard material. Whereas it is customary to use a hard material for one seal part and a less hard material for the other seal part, the present use of two very hard materials is advantageously used to minimize the dynamic torque on the ring 61 by accommodating the thin seal face design to be described. The dynamic torque is the sum of the steady torque and the previously mentioned varying torque which arises from the alternate stick-slip contact between the ring 61 and the washer 53. The use of two hand materials is also advantageous becuase scoring or wear of the faces of the ring 61 and the washer 53 will be minimized if abrasive contaminants get between the faces. Also, a hydraulic film is more readily formed with the thin seal face.

The thin seal face design mentioned above relates to the dimensions of the engaging faces 63 (FIGS. 2 and 6). As shown in FIG. 6, the parts 53 and 61 are annular and the area of engagement of the faces 63 is shown by the shaded portion. It has been found, and it is considered part of this invention, that highly advantageous results are obtained when the radial width of the seal face is within the range of from approximately 0.045 inch to approximately 0.070 inch. A dimension of approximately 0.065 inch is preferred for ease of manufacturing purposes, and because it operates with lower dynamic torques during normal operating conditions. The smaller dimension of 0.045 inch provides maximum reduction in the dynamic torque during boundary lubrication conditions. By boundary lubrication conditions is meant a transitional period when the film between the seal faces 63 is changing, either from a totally wet condition to a totally dry condition or vice versa. When taking all of the above factors into consideration, the optimum width is approximately 0.065 inch. The foregoing dimensions are optimum both when using silicon carbide for both members 53 and 61 and when using silicon carbide for one member and carbon for the other member, and when operating under the face load normally encountered in a prior art seal used in such a pump. A seal including seal faces of silicon carbide and a radial dimension of 0.065 inch provides new and unexpected results in that the dynamic torque is reduced under different operating conditions, the coefficient of friction is reduced, and this hard material will resist seal wear in spite of the relatively small radial width. These results are ascribed to a continuous stable hydrodynamic film readily maintained with the improved 0.065 inch face dimension. The radial width of prior art seal faces is nearly twice as wide as the present construction. While the diameter of the seal face is not considered to be critical, the outer diameter of a specific example was between approximately 1.215 inches and approximately 1.225 inches.

In the construction shown in FIGS. 2 to 5 and in accordance with the present invention, the bellows material is a fluorinated elastomer that is a peroxide cured copolymer of tetrafluoroethylene and propylene alternated in monomer sequence. This material has been found to be resistant to the amine inhibited coolant chemicals at elevated engine temperature (around 200° F.), and it is resistant to deterioration due to oxidation. The adhesives, except for the epoxy 55, are made of nitrile-phenolic based materials which withstand the coolant.

The metal parts of the seal are preferably made of stainless steel to resist corrosion and to reduce the effects of galvanic action.

The bellows could be constructed with the ribs as described and be made of a peroxide cured nitrile compound, which would also extend the life of the seal.

FIG. 7 illustrates a bellows 101 having the same configuration as the bellows 66 but is a composite of two materials. In the illustration it is made up of two layers 102 and 103. The external layer 103 is made of any peroxide cured nitrile compound, and the internal layer 102 is made of any fluoroelastomer. The first will withstand the coolant and the second will withstand oxidation. Instead of two relatively thick layers as shown, the bellows could be made primarily of a peroxide cured nitrile and have a fluoroelastomer coating on its internal surface.

It will be apparent from the foregoing that a new and useful rotary seal construction has been provided. The configuration of the bellows including the tangentially directed ribs on the central section of the bellows and the slope of the central section protects the bellows against failure due to torsional stresses. The materials used for the bellows and the other seal parts are resistant to deterioration, the dimensions and the hard material used for the two seal faces provides improved performance, and the parts of the seal are adhesive bonded in place in an improved manner to resist the high rotation torques.

What is claimed is:

1. In a seal including a stationary first part and a second part subjected to rotational torques, the improvement of a bellows comprising a fixed end secured to said first part and a movable end secured to said second part, a central section connecting said fixed and movable ends, said ends and said central section being generally annular, and a plurality of ribs formed on said central section and extending generally tangentially between said fixed and movable ends.

2. Apparatus as in claim 1, wherein said fixed end has a larger diameter than said movable end, and said central section slants axially and radially outwardly from said movable end to said fixed end.

3. Apparatus as in claim 1, wherein said ribs are formed on the outer surface of said central section.

4. Apparatus as in claim 1, wherein said plurality of ribs comprises a first set of ribs extending tangentially in one direction and a second set of ribs extending tangentially in the other direction.

5. Apparatus as in claim 1, wherein the material of said bellows is a fluorinated elastomer.

6. Apparatus as in claim 1, wherein the material of said bellows is a peroxide cured copolymer of tetrafluoroethylene and propylene alternated in monomer sequence.

7. Apparatus as in claim 1, wherein said bellows is comprised of an inner layer and an outer layer, said outer layer consisting of a peroxide cured nitrile compound and said inner layer consisting of a fluoroelastomer.

8. Apparatus as in claim 1, wherein said seal further includes a member which rotates during operation of the seal, said second part engaging said member, said second part and said member being made of a hard silicon carbide.

9. A seal for an engine coolant pump, including a stationary first part and a second part which is subjected to rotational torques, the improvement of a bellows connecting said first and second parts, one side of said bellows being exposed to the coolant and the other side being exposed to air, said sides being resistant to said coolant and to oxidation respectively, said bellows comprising a first layer on said one side and a second layer on said other side, and said first layer comprising a peroxide cured nitrile, and said second layer comprisng a fluoroelastomer.

10. Apparatus as in claim 9, wherein said second layer is a coating of fluoroelastomer.

11. In a seal including a stationary first part and a second part subjected to rotational torques, the improvement of a bellows comprising a fixed end secured to said first part and a movable end secured to said second part, a central section connecting said fixed and movable ends, said ends and said central section being generally annular, a plurality of ribs formed on said central section and extending generally tangentially between said fixed and movable ends, and said bellows being made of a peroxide cured nitrile compound.

12. Apparatus for a seal for an engine coolant pump, the seal making a sealed connection between a rotating shaft and a stationary member that encloses the shaft, the improvement of first and second annular seal members, said first seal member being fastened to said shaft and said second seal member being fastened to said stationary member and said members being subjected to rotational torques during operation of the engine, said first and second seal members being made of a relatively hard material having a low coefficient of friction and at least one of said members being made of silicon carbide, said annular seal members having engaging seal faces, and the radial width of said faces being relatively small to provide a continuous stable hydrodynamic film and reduced dynamic torque, a bellows connecting said second seal member to said stationary member, and an adhesive securing said bellows to said second seal member, said adhesive comprising a nitrile phenolic based material.

13. Apparatus as in claim 12, wherein both of said annular seal members are made of silicon carbide.

14. Apparatus as in claim 12, wherein said radial width is preferably in the range of from approximately 0.045 inch to approximately 0.070 inch.

15. Apparatus as in claim 14, wherein said radial width is preferably approximately 0.065 inch.

16. Apparatus as in claim 14, wherein the outer diameter of said seal faces is approximately in the range between 1.215 inches and 1.225 inches.

17. Apparatus as in claim 12, and further comprising a rotatable part secured to the shaft, and a resilient boot connecting said first seal member to said rotatable part.

18. Apparatus as in claim 17, wherein said boot is secured to said rotatable part by a nitrile phenolic based adhesive and is secured to said first seal member by an epoxy adhesive.

19. Apparatus as in claim 17, wherein said boot comprises a rubber coating vulcanized onto said rotatable part, and said first seal member is secured to said rubber coating by an epoxy compound.

20. Apparatus as in claim 12 wherein said bellows includes a fixed end secured to said stationary member, a movable end secured to said second seal member, and a central section connecting said fixed and movable ends, said ends and said central section being generally annular, and a plurality of ribs formed on said central section and extending generally tangentially between said fixed and movable ends.

21. Apparatus as in claim 20, wherein said fixed end has a larger diameter than said movable end, and said central section slants axially and radially outwardly from said movable end to said fixed end.

22. Apparatus as in claim 20, wherein said ribs are formed on the outer surface of said central section.

23. Apparatus as in claim 20, wherein said plurality of ribs comprises a first set of ribs extending tangentially in one direction and a second set of ribs extending tangentially in the other direction.

24. Apparatus as in claim 12, wherein the material of said bellows is a fluorinated elastomer.

25. Apparatus as in claim 12, wherein the material of said bellows is a peroxide cured copolymer of tetrafluoroethylene and propylene alternated in monomer sequence.

26. Apparatus as in claim 12, wherein said bellows is comprised of an inner layer and an outer layer, said outer layer consisting of a peroxide cured nitrile compound and said inner layer consisting of a fluoroelastomer.

27. Apparatus as in claim 12, wherein one side of said bellows is exposed to the coolant and the other side is exposed to air during use, said sides being resistant to said coolant and to oxidation respectively.

28. Apparatus as in claim 17, wherein said bellows is comprised of a first layer on said one side and a second layer on said other side.

29. Apparatus as in claim 12, wherein said bellows is made of a peroxide cured nitrile compound.

* * * * *